United States Patent

Deman et al.

[15] 3,648,248

[45] Mar. 7, 1972

[54] APPARATUS INCLUDING SAMPLING AND QUANTIZING MEANS FOR DISCRIMINATING RECEIVED DIGITAL SIGNALS

[72] Inventors: Pierre Deman; Jean Pierre Gouyet, both of Paris, France

[73] Assignees: Thomson-CSF; Jean Daniel Label

[22] Filed: June 8, 1970

[21] Appl. No.: 44,045

[30] Foreign Application Priority Data

June 13, 1969 France....................................6919677

[52] U.S. Cl...........................................................340/172.5
[51] Int. Cl............................................................G06f 3/00
[58] Field of Search..................340/172.5; 307/269; 328/63, 328/179; 325/346, 416

[56] References Cited

UNITED STATES PATENTS 3,249,878 5/1966 Magnin....................................328/63

*Primary Examiner*—Raulfe B. Zache
*Attorney*—Cushman, Darby & Cushman

[57] ABSTRACT

A device for processing digital pulse code modulated signals comprises means for sampling and quantizing the signal at a frequency which is a multiple of that at which the digits are transmitted. These samples are stored and summed after each sampling operation.

The result of the summing is fed to reference threshold devices to generate the requisite parameters for the control of the receiver, by means of logic circuits.

5 Claims, 2 Drawing Figures

Figure 1:
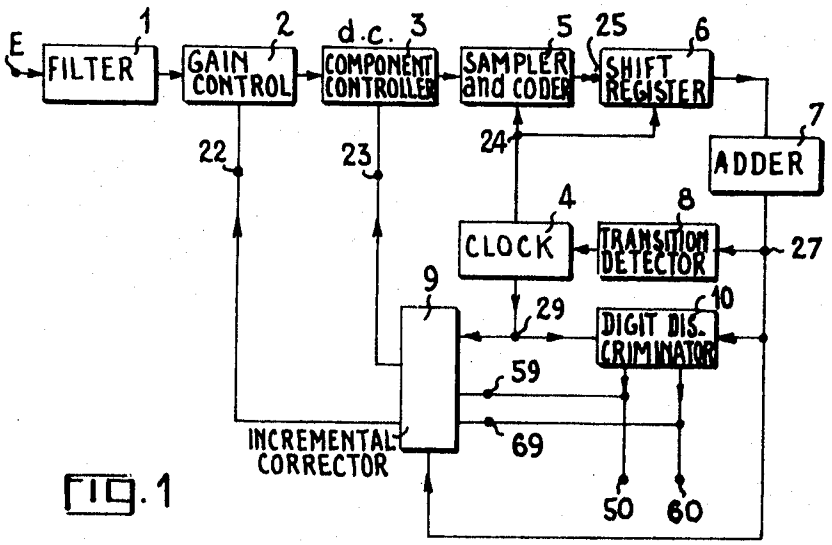

APPARATUS INCLUDING SAMPLING AND QUANTIZING MEANS FOR DISCRIMINATING RECEIVED DIGITAL SIGNALS

The present invention relates to devices for processing signals which are transmitted in digital form, and more particularly devices of this kind as used in receivers for pulse code modulated (PCM) signals.

Those skilled in the art will be well aware that high-fidelity retrieval of these signals, whether transmitted in the baseband or through the medium of a carrier which they modulate, requires appropriate processing in particular because of variations in the received level and of the presence of noise and parasitic components.

The obtaining of the information required for the automatic control of the level of the received signals and for synchronizing operations, as well as the filtering of these signals, requires many distinct operations which are carried out by different circuits, of analogue kind, which do not readily lend themselves to compact design employing logic circuitry. Moreover, the input filter has to have critical characteristics in order to obtain best matching to the noise affected signal. It is therefore suitable only for a predetermined rate of transmission of the digits. It is on object of the invention to remedy these drawbacks. The signal-processing device in accordance with the invention comprises:

an input filter, a gain-control circuit having a control input, a continuous control adjustment circuit having a control input, and a clock producing pulses whose frequency is equal to the frequency of transmission of the digits; it is characterized in that it comprises means for sampling and quantizing said signals in numerical form at a frequency which is a multiple $m$ of the frequency of said clock, means for storing and summing the $m$ numbers resulting from the $m$ last quantizing operations, a transition detector receiving the successive sums coming from said summing means and controlling the phase of said clock, an element which makes a decision on the received digit and utilizes said sums and said pulses, and means for correcting said gain and said continuous component, which means employ said sums and said pulses and supply control signals to said gain-control circuit and the circuit for adjusting the continuous component.

Figure 2:
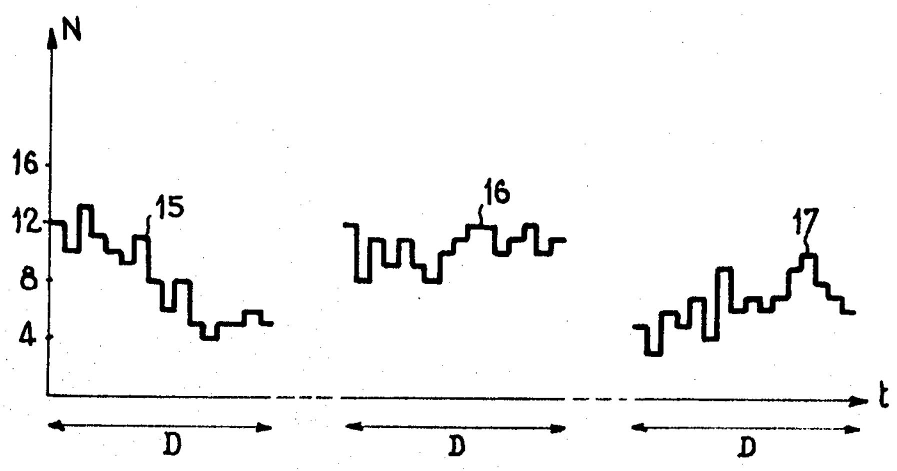

For a better understanding of the invention to show how the same may be carried into effect reference will be made to the drawing accompanying the following description and in which:

FIG. 1 is a block diagram of an embodiment of a processing system in accordance with the invention, applied to binary digit transmission; and FIG. 2 is an explanatory diagram.

In FIG. 1, the signals received in the baseband are applied to the input E and successively pass through a filter 1, gain-control circuit 2 and a circuit 3 for controlling the DC component and are then applied to a sampler 5 which effects permanent quantized sampling of the signal.

Each sample has a duration equal to a fraction of that of a digit and is fed to the input 25 of a shift register 6, which simultaneously displays the levels of the successive samples taken during a time interval equal to the duration of a digit, and applies them to a summing element 7 which delivers at its output 27, the sum reached with each sampling operation.

This information is transmitted in parallel to an incremental corrector 9, to a digit discriminator 10, and to a transition detector 8 all of which will be described in more detail later. The detector 8 controls a clock 4 which produces at 24 pulses whose repetition frequency determines the sampling frequency and which are passed in parallel to the sampler 5 and the register 6. The clock 4 also provides at its output 29, pulses whose repetition frequency is equal to that of the digits.

The latter pulse train is transmitted in parallel to the incremental corrector 9, which delivers at 22 and 23 the control voltages for the corresponding circuits 2 and 3, and to the digit discriminator 10 which delivers at 50 and 60 the signals corresponding to the respective values "zero" and "one" of each binary digit, thus reconstituted, the corresponding information being also transmitted respectively at 59 and 69 to the incremental corrector 9.

The filter 1, the gain-control circuit 2 and the DC component controlling circuit 3 are entirely conventional and can be of any known type. As will be illustrated hereinafter, the filter 1 may be a low-pass filter of very simple design with noncritical characteristics.

It will be assumed in the example described here that the signals processed have two distinct levels of the same duration D and thus represent respectively the binary digits "0" and "1."

The quantized sampling takes place in the following manner:

The clock 4 produces at its output 29, pluses with a repetition frequency $F=1/D$, which is the frequency of the transmitted binary digits. At its output 24, the clock 4 produces a signal whose frequency is a multiple of the frequency F, say for example 16F, thus making it possible to carry out the sampling 16 times during the time D of transmission of each digit. The sampler 5 thus essentially comprises a gate which is operated at the frequency 16F and a 16-level binary coding device ($2^n$ where $n$=4 for example).

These data are transmitted to a shift register 6 comprising $m$=16 sets of 4 binary elements in parallel which display the coded level of 16 successive samples shifting at the frequency 16F through the register 6.

The summing element 7, which is, for example, formed by numerical adders, permanently produces a linear sum which varies at the frequency 16F with which the content recorded in the register 6 changes.

This sum value is picked up at 27 and processed by the transition detector 8 which permanently receives the information from it, and by the incremental corrector 9 and the digit discriminator 10, both of which include an input gate controlled by the clock 4 and therefore use this information only at the instant at which the sum of the samples is of significance for a binary digit.

In FIG. 2, the curves 15, 16 and 17 represent three examples of possible distributions of the 16 sampling quanta recorded by the register 6 and added to each other by the adder 7.

The levels N have been plotted along the ordinates. The time $t$ is plotted on the abscissae and the duration D of each group of 16 samples is equivalent to that of one binary digit.

The value of the sum S delivered by the adder 7 can therefore vary between 0 and 16×16=256.

The transition detector 8 has a threshold which is adjusted to the intermediate value of S, i.e., to 128, which will be considered to denote the existence of a transition at an instant which precedes by $D/2$, that at which the sum furnished by the adder 7, passes through this value. Each time this threshold is passed, that is to say each time the sign of the value S−128 changes, the transition detector supplies a pulse which controls the phase of the clock 4. The samples 15 in FIG. 2, the sum S of which is equal to 128, illustrate one of these instants.

The clock 4 thus unblocks the input of the digit discriminator 10 and the incremental corrector 9, at the instants at which the value S applied to them, is effectively the sum of the 16 sampled levels of one and the same binary digit. For this to be the case, this unblocking has to take place at instants which are offset by $D/2$ with respect to the instant at which a transition has been detected.

The groups of samples 16 and 17 in FIG. 2, correspond to two such instants, the values of their respectively sums being 167 and 105.

The digit discriminator 10, has a threshold which is set to the mean value 128 and discriminates sums which are less than or greater than this threshold and these are accordingly interpreted as values 0 and 1 of the binary digits which are then passed to the corresponding outputs 50 and 60.

The incremental corrector 9 has means for comparing the sums applied thereto to three thresholds and for delivering to the gain control input and the DC control input control signals as a function of the comparisons thus effected and of the signals delevered by the digit discriminator; one threshold is equal to the mean value of $S$ ($S$=128), the two others, representing the nominal values of $S$, corresponding respectively to the digits 0 and 1. These values are intermediate between the mean value and either the maximal or the minimal value of $S$ and, for example, taken halfway between said mean value and the extreme values $S$=0 and $S$=256. In other words these values are taken to be $S$=192 and $S$=64.

Where the value of the sum reaching the incremental corrector 9 is close to one of these three thresholds, no correcting signal is supplied at the inputs 22 or 23.

If this value is somewhere between 128 and 192, this being the case corresponding to the curve 16 of FIG. 2 and indicating that the signal is below its nominal value, positive corrections are made to the gain (increasing the interval between the maximum and minimum of the signal), and to the continuous component (which translates the signal); these corrections will be negative if the value $S$ of the sum was such that the condition $192 < S < 256$ prevails.

If $64 < S < 128$, which is the case described by the curve 17 of FIG. 2, and signifying that the signal is above its nominal value, then a reduction is effected by a positive correction to the gain and a negative correction to the continuous component, the reverse procedure being adopted if the condition $0 < S < 64$ prevails.

Assessment of the correction required to the gain ought, strictly speaking, to be based upon the interval between the values of the sums corresponding to the digits 1 and 0. It is simpler, however, and indeed has been found entirely satisfactory, to take as a basis the criteria described above, provided that no gain correction is effected in respect of a given digit, unless it differs from the preceding one.

The directions of the corrections are listed in the following table:

| Sum S | >0 <64 | 64 | >64 <128 | 128 | >128 <192 | 192 | >192 <256 |
|---|---|---|---|---|---|---|---|
| Restored digit | 0 | 0 | 0 | ----- | 1 | 1 | 1 |
| D.C. component correction | + | 0 | − | 0 | + | 0 | − |
| Gain correction, preceding digit: | | | | | | | |
| 1− | − | 0 | + | 0 | 0 | 0 | 0 |
| 0− | 0 | 0 | 0 | 0 | + | 0 | − |

The corrections produced at 22 and 23 by the incremental corrector 9 can be constituted by quantized signals which are identical whatever the magnitude of the discrepancy to be corrected; they will shift the signal towards its nominal value by successive approximations. But it is possible to reach the correct condition more rapidly and more accurately, by giving the correcting signals values which are proportional to the difference between the value of $S$ and the corresponding threshold.

It is desirable to provide a tolerance range around the threshold values, in which no correction is effected, the width of the range being for example at least equal to the smallest quantized signal used.

The arrangement described is applicable not merely to the processing of binary signals and can equally be used with signals having a number $p$ of levels. All that is then necessary is to provide in the digit discriminator 10 and the transition detector 8 a number $p-1$ of thresholds, a number $p$ of information outputs, and design of the incremental corrector 9 to operate on criteria similar to those described in the table hereinbefore, but with $p$ further threshold intermediate values.

The input filter 1 is merely intended to smooth the input signal for example, to eliminate the frequencies higher than the sampling frequency, and to limit the fluctuations in the noise component to within the capacity of the quantizing system incorporated in the sampler 5. The filter can therefore have a very wide band, which is not critical, for example somewhere between 2 and 6 times the frequency F, and can take the form of a simple RC element.

Instead of a linear summing, a weighted summing of the samples may be performed, the weighting factor assigned to each sample being translated into terms of binary logic. The summing may also be made by means of an analog adder, for example of the well-known type comprising resistors of predetermined resistance corresponding to the designed weighting factor.

Thus, the equivalent of the conventional kind of filtering matched to the input signal with its noise component is obtained, this for various conditions of transmission, by manually or automatically modifying the distribution of the weighting factors.

It will be clearly evident from the foregoing that the numerical summing of quantized samples of the received signal, in accordance with the invention, has the following major advantages:

The design can be more compact, more reliable and cheaper since the logic circuits can easily be produced in integrated circuit form.

Operation is extremely flexible; the frequency of transmission, in particular, may be modified within wide limits simply by adjusting the frequency of the controlled clock.

Optimization of performance, under various conditions of transmission, can easily be effected by simple logic circuit control techniques which effect variable weighting of the summed samples.

The system can be adapted to data transmission equipment of the most varied kinds: in particular, it is applicable to data transmission devices using two levels or more and/or employ any known kind of modulation technique.

What is claimed is:

1. A device for processing digital signals having a plurality of nominal levels, comprising: a clock having a phase control input, a first output for delivering pulses at a first frequency equal to the frequency F of digital transmission and a second output for delivering pulses at the frequency $m$F, where $m$ is an integer greater than 1; a series circuit comprising an input filter, means coupled to said second output for sampling said digital signals at said frequency $m$F and coding the amplitude of each sample by a number also expressed in digital form, means for storing the $m$ samples resulting from the coding of the last obtained successive $m$ samples, and means, having an output, for summing said $m$ samples; a transition detector having an input coupled to said output of said summing means, and an output coupled to said phase control input; and a digit discriminator having a first input coupled to said output of said summing means, a second input coupled to said first output of said clock, and $p$ outputs, $p$ being the number of said nominal levels.

2. A device as claimed in claim 1, wherein: a gain control circuit, having a gain control input, and a circuit, having a AC control input, for adjusting the DC component of said signals, are inserted in series between said input filter and said sampling means; said device also comprises an incremental corrector having a first input coupled to said first output of said clock, a second input coupled to said output of said summing means, $p$ other inputs respectively coupled to said $p$ outputs of said digit discriminator, a first output coupled to said gain control input, and a second output coupled to said DC control input; said coding means comprise a binary coding device having $2^n$ levels, $n$ being a given positive integer; and said storing means are a shift register including $m$ sets of $n$ parallel-connected binary elements, the stepping of said shift register being controlled by said pulses at said frequency $m$F.

3. A device as claimed in claim 2, wherein $p$=2 and wherein said transition detector comprises means for delivering an output pulse when the value of any one of the sums delivered by said summing means is equal to a predetermined level; said digit discriminator comprising means, controlled by said pulses at said frequency F, for comparing said sums to said predetermined level, said predetermined level delimiting two successive ranges of values respectively associated with said outputs of said digit discriminator, said digit discriminator further comprising means for delivering a pulse at a given output when a sum is comprised in the range of values associated therewith.

4. A device as claimed in claim 3, wherein said incremental corrector has further inputs coupled to said outputs of said digit discriminator and wherein, said two successive ranges of values being respectively associated with two predetermined intermediate thresholds respectively comprised in said two ranges, said incremental corrector comprises means for comparing each of said sums with said predetermined level and said two intermediate thresholds and for delivering to said gain control input and to said DC control input control signals as a function of the results of the comparisons effected by said comparing means and of the signals delivered by said digit discriminator.

5. A device as claimed in claim 1, wherein said summing means include weighting means for respectively weighting the values of said last obtained, successive *m* samples according to their position number in the series of said *m* successive samples and wherein the sums delivered by said summing means are the correspondingly weighted sums, and wherein said input filter is a low-pass filter constituted by a resistor and a capacitor.

* * * * *